United States Patent [19]
Meihofer

[11] 3,906,232
[45] Sept. 16, 1975

[54] WEB BREAK DETECTOR
[75] Inventor: Edward F. Meihofer, Norfolk, Mass.
[73] Assignee: Butler Automatic, Inc., Canton, Mass.
[22] Filed: June 17, 1974
[21] Appl. No.: 479,900

Related U.S. Application Data
[63] Continuation-in-part of Ser. No. 411,413, Oct. 31, 1973, abandoned.

[52] U.S. Cl. ............... 250/341; 250/338; 250/571
[51] Int. Cl.² ........................................ G01N 21/30
[58] Field of Search .......... 250/338, 341, 571, 562, 250/221, 471, 572

[56] References Cited
UNITED STATES PATENTS

| | | | |
|---|---|---|---|
| 2,078,800 | 4/1937 | Juchter | 250/471 |
| 3,198,952 | 8/1965 | Benham et al. | 250/221 |
| 3,283,162 | 11/1966 | Ouittner | 250/572 |
| 3,723,737 | 3/1973 | Zeldman et al. | 250/221 |
| 3,723,738 | 3/1973 | Brenner et al. | 250/221 |
| 3,816,745 | 6/1974 | Primm et al. | 250/221 |
| 3,819,947 | 6/1974 | Johnson | 250/562 |

*Primary Examiner*—Harold A. Dixon
*Attorney, Agent, or Firm*—Cesari and McKenna

[57] ABSTRACT

A system is provided for monitoring a web of moving material for breaks in the web. The system includes a light source directed at the web to be monitored and sensor means including photodetector optics aimed at the web to detect light from the source and generate an electrical signal depending on the presence or absence of web in the light path. Clock means are provided to generate a train of pulses for intermittently exciting the infrared light source. The output pulses of the sensor are applied to a comparator adapted to generate a signal pulse each time the sensor output exceeds a predetermined level. The output of the comparator forms one input to a gate, the other input to the gate being the clock pulses so that the comparator pulses can pass the gate only when the IR light source is excited. The output of the gate is fed to a detector circuit adapted to generate an alarm signal depending on the presence or absence of pulses from the gate.

13 Claims, 3 Drawing Figures

WEB BREAK DETECTOR

RELATED APPLICATION

This application is a continuation-in-part of my application Ser. No. 411,413, filed Oct. 31, 1973, entitled WEB BREAK DETECTOR, now abandoned.

BACKGROUND OF THE INVENTION

The present invention relates to a system for use in association with web handling machines which will cause such machines to shut down or otherwise trigger an alarm should a break or significant slack develop in the web.

In many industries, webs of material such as paper, fabric, plastic film, foil and the like are processed. In the event of a break in the web, it is often desirable to deactivate all or certain portions of the web handling equipment so as to prevent waste, damage to the equipment, and to minimize downtime.

Heretofore, various types of equipmennt have been available to detect web breakage. The earliest type of such equpiment consisted of a wire or arm with a wheel attached so as to be supported by the web passing in close proximity. In the event of a web break, the arm, losinig such support, would travel to the end of its stroke, thereby actuating a switch indicative of a web break. An undesirable characteristic of this type of system is the fact that the equipment must touch the moving web. This is frequently undesirable as the moving web may be delicate or have wet ink or a coating on it that could be damaged by physical contact with such a device.

An improvement on the early web break detection equipment utilized photoelectric means in place of the contacting member. The prior art photoelectric systems fall into two categories. In the first case, a light source is located on one side of a web material and the receiver or photocell is located on the other side of the web. In the event of a web break, the cell becomes exposed to the light source, thereby producing a signal indicative of the break. This type of system is disadvantaged because it cannot detect a loss of web tension not necessarily coupled with a break in the web.

In the second type of photoelectric systems, the light source and receiver are located on the same side of the web. A light is projected onto the web and the light is reflected to a receiver or photocell which produces a signal indicative of proper web conditions. As long as the web remains in close proximity to the system components and as long as the web surface and color are sufficiently reflective to satisfy the receiver, web break indication circuits associated with the photocell are not activated. The main disadvantage of this type of system resides in the fact that the receiver must be very sensitive to the reflection from the web which could be relatively weak in the case of a web of dull material. As a result, strong ambient lighting will often prevent the photocell from properly reacting to a break or slackening of the web. The acuteness of this problem may best be appreciated when it is realized that in many installations where large web handling machines are employed, it is necessary to have strong lighting to provide the operator good visibility in making the various adjustments necessary for proper and safe operation of the machinery. Accordingly, photoelectric systems of this type can only function reliably where careful precautions are taken to shield the photoelectric receiver from extraneous light.

In view of the above, it is the principal object of the present invention to provide a noncontact web break detection system of the photoelectric type which is virtually unaffected by, and totally independent of, ambient light conditions.

SUMMARY OF THE INVENTION

The above and other beneficial objects and advantages are attained in accordance with the present invention by providing an improved system for monitoring a moving web of material for breaks and/or loss of tension. The system includes a light source, preferably of the infrared type, aimed at the web to be monitored. The light source is intermittently excited by a train of pulses generated by a clock. Sensor means including photoelectric optics are also aimed at the web to detect the light from the source, depending upon the presence or absence of web in the light path. In one embodiment, the source light is reflected from the web to the sensor and in the other, the source light is transmitted to the sensor only in the absence of web.

The sensor means further includes electronics adapted to generate an electrical signal output in response to the detected light. The output of the sensor is compared to a predetermined level representative of the signal level for proper web conditions and adapted to generate a gate input signal if the predetermined level is met. The comparator is connected through a gate to a detector circuit adapted to generate an alarm signal, depending upon the presence of absence of an input pulse from the gate. An additional input to the gate comprises the clock pulses so that the detector circuit can only receive pulses when the light source is excited. In this way, the system is virtually unaffected by ambient light conditions.

DETAILED DESCRIPTIONN OF THE PREFERRED EMBODIMENTS

Figure 1:
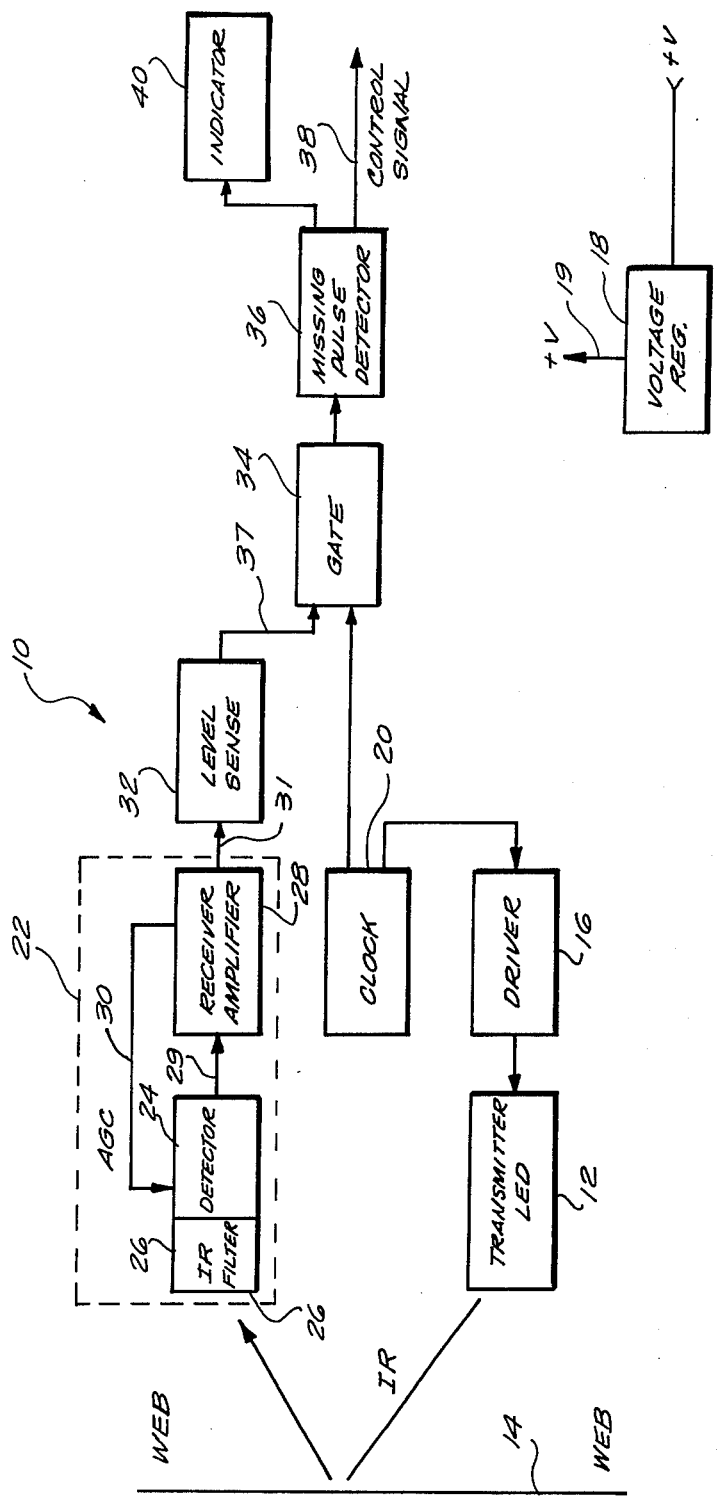
FIG. 1 is a block diagram of the web break detecting system of the present invention.

The present invention is illustrated in the drawings in which similar components bear the same reference numerals throughout the views. In the drawings and the following description, only one web break detector system assembly is described and illustrated. It should be understood, however, that in practice, it is common to have web break detector assemblies positioned along the path of the web at various points where protection is desired. Thus, it is not uncommon to have web break detection equipment positioned at as many as twenty or more points along the web path. Further, since in many instances the web of material to be monitored is relatively wide, it may be desirable to have a number of such assemblies positioned at a particular point spanning the width of the web so as to monitor the entire web width at that particular point. In these cases additional assemblies such as the one presently described may be utilized as required.

In accordance with the present invention, the web break detection system 10 comprises a light source 12 focused on a web 14 to be monitored. For best results, the source 12 should emit light different from the ambient light, e.g. in the infrared region of the spectrum. The infrared light source may, for example, comprise a light-emitting diode such as those formed from gallium arsenide. The light source 12 is driven by a drive circuit 16 powered by a regulated voltage source 18 through line 19. The driver 16, in turn, is controlled by an oscillator or clock 20 which generates a train of pulses to intermittently excite the infrared light-emitting diode. Preferably, the source 12 should receive strong current pulses of short duration and relatively high frequency to minimize power requirements. In a successful practice of the invention, the frequency of the oscillator 20 was 100 hz. and the pulse duration approximately 0.1 ms. In this manner, the ON portion of each cycle represents a duty cycle on the order of only 1%.

In the preferred embodiment of my detector, light source 12 is focused on web 14 to reflect off the web to a sensor 22. Sensor 22 includes a photoelectric cell 24 and associated optics imaged on the web to receive reflected light, in this case, IR radiation, and focus the same on the photoelectric cell. To this end, an infrared filter 26 is positioned in front of the optics to filter out all but infrared radiation. Such a filter may, for example, comprise a Kodak Wratten filter.

The photoelectric cell 24 generates a signal in response to the impinging IR radiation which is fed to a receiver circuit including an amplifier 28 through line 29. The receiver circuit suitably shapes and amplifies the output of the photocell. The gain for the amplifier is controlled by a feedback loop 30 to the photocell so that its output is constant so as to make the overall system insensitive to variations in the color, texture, etc., which affect the reflectivity of the web material being processed in the monitored machine at any given time. In other words, the present system automatically accommodates itself to the processed web.

The output of the amplifier is fed through line 31 to a comparator circuit 32 which senses the voltage level of the amplified signal comparing it to a predetermined voltage determined by the setting of potentiometer 33 and applied to the comparator on line 35. The preset voltage on line 35 corresponds to a level indicative of the receipt of sufficient reflected IR radiation to indicate proper web conditions. In this regard, it should be realized that in the event of a break in the web, the IR radiation of light source 12 will not be reflected off the web and, hence, the output of photoelectric cell 24 will drop. Similarly, if the web is unduly slack, the reflected IR radiation will decrease and, hence, cause a drop in the ouput of cell 24. The setting of potentiometer 33 is governed by the reflective characteristics of the web being monitored. If the input 31 to comparator 32 from the photoelectric cell exceeds the preset input 35 to the comparator, a comparator output signal is generated on line 37 feeding gate 34 and indicative of normal web conditions.

The output of comparator 32 forms the input to AND gate 34. A second input to gate 34 is the pulse train output of clock 20. Thus, the comparator output passes gate 34 only during those intervals when the IR source is excited. In this manner, the system is rendered virtually totally independent of ambient light conditions and effects. The output of gate 34 comprises a train of pulses identical with the clock pulse output as long as the web is unbroken and under suitable tension. In the event of an abnormality in the web condition, there is no output of comparator 32, thus preventing a gate output signal.

Figure 2:
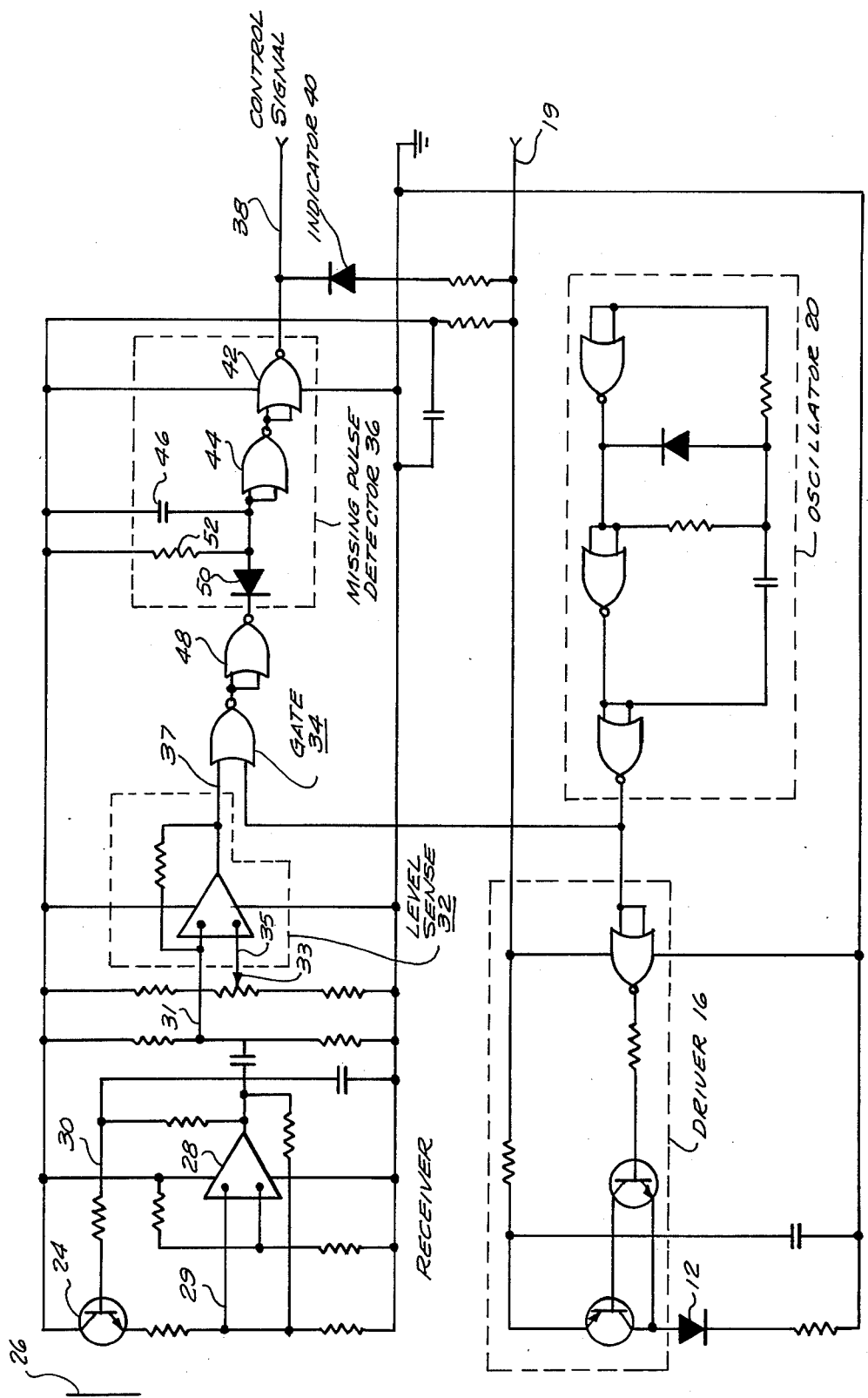
FIG. 2 is a schematic representation of the components of the blocks of FIG. 1.

As best seen in FIG. 2, the output of gate 34 is fed to monitoring circuit 36 which seeks to detect missing pulses. In the event of sufficient missing pulses, a control signal is generated along line 38 which may be used to shut down the machinery or to trigger an alarm indicative of the abnormality. To this end, the control signal comprises the HI output of gate 42. The ouput of gate 42 is normally maintained LO by the HI output of inverter gate 44 which, in turn, receives a constant LO input signal through capacitor 46. The charge on capacitor 46 is maintained constant by the train of pulses from gate 34 through gate 48 and diode 50. In the event of an interruption in the pulse train, capacitor 46 will, after some time, discharge through resistor 52, thereby reversing the output of gate 44, causing gate 42 to switch to its HI state. In a successful practice of the present invention, the values of capacitor 46 and resistor 48 were chosen so as to permit a lapse of five pulses to occur prior to the generation of a control signal so as to permit some time for an apparent web abnormality to correct itself.

An indicator comprising an LED 40 is also connected to each monitoring circuit 36 to provide visual indication of the condition of the web. On a given machine, there may be many break detectors placed at different points in the machine and this equally many indicators 40 arranged on a panel board. Thus, during normal operation, diodes 40 are excited, giving indication that the break detectors are all operating normally and properly sensing web. If, for some reason, a break detector malfunctions or the web breaks, one or another of the indicators 40 will go out so that the operator knows immediately which break detector malfunctioned or where in the machine the web broke.

Figure 3:
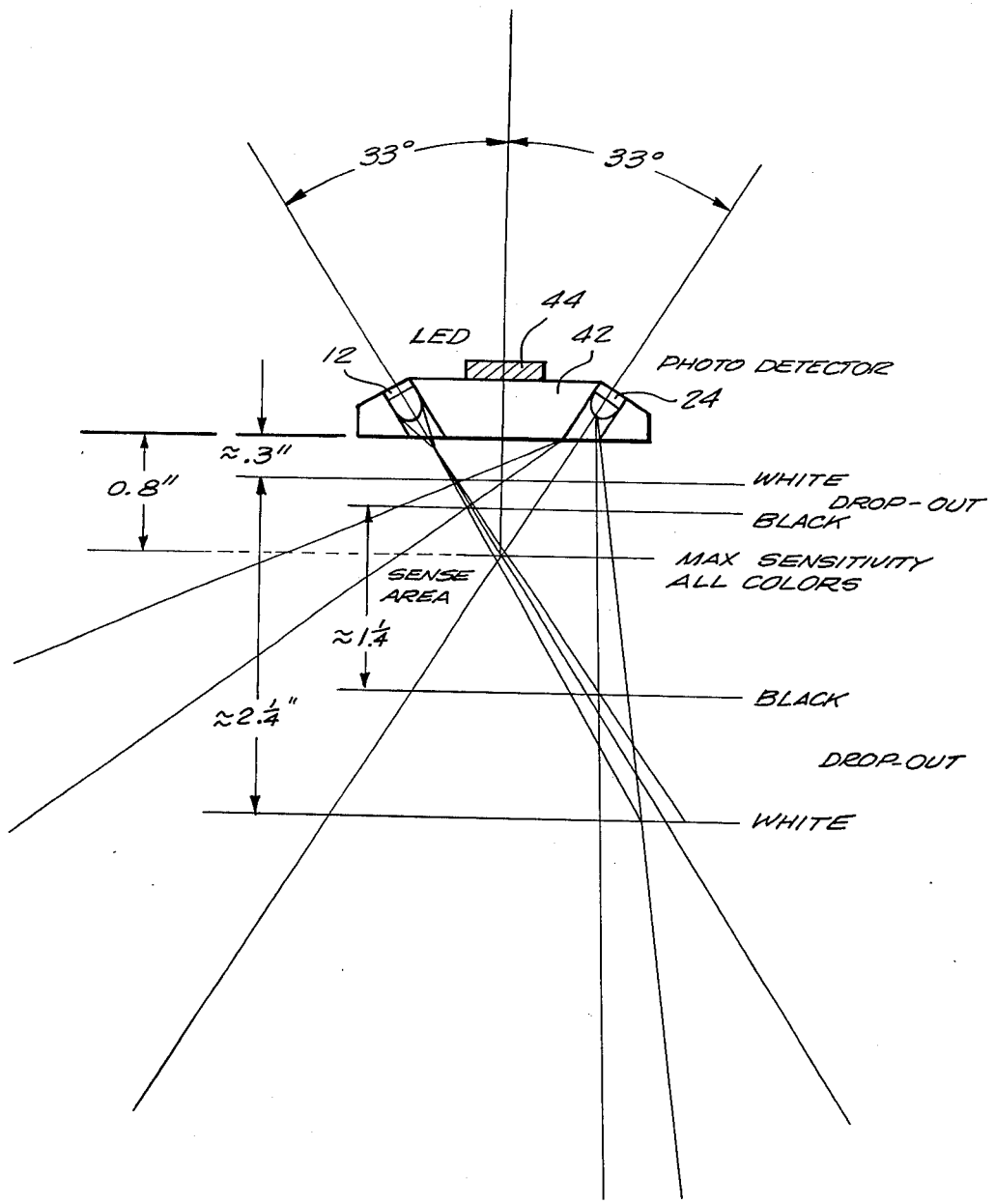
FIG. 3 is a schematic representation of the optics of the present system.

Referring now to FIG. 3, the present detector embodiment is specially designed for maximum sensitivity to a slack web condition which is undesirable and calls for correction, yet minimum sensitivity to web flutter which is unavoidable at high web speeds and of no appreciable moment. In other words, the system includes the equivalent of a low pass filter as to movement of the web in the direction normal to web travel.

More particularly, the IR light-emitting diode 12 and photodetector 24 are secured to a mounting bar 62 which, in turn, is mounted to a frame 64 fixed with respect to the web. The sensitivity of the photodetector 24 will vary with respect to the color of the web being monitored, as illustrated in FIG. 3 wherein the relative positions for the near and far dropout points are given for both ends of the spectrum (designated white and black). For maximum sensitivity for all colors to a slack web and minimum response to the higher frequency web flutter, it has been found that the sensors should be positioned approximatley 0.8 inches from the web. Also, the light source 12 and photodetector 24 should be positioned on opposite sides of a vertical axis from the light bar to the web both at an angle of approximately 33° to the vertical. This permits approximately plus or minus 0.5 inches of web flutter without appreciable loss of sensitivity.

In another embodiment of the invention, the source 12 and sensor 24 are situated on opposite sides of the web as shown in dotted lines by source 12' in FIG. 1. In this case, detector 24 senses light only when there is no web between the source and sensor, i.e. when the web breaks. After detector 36 detects a predetermined number of pulses indicating a break, a signal 38 is produced to stop the machine as before.

Thus, in accordance with the above, the aforementioned objects are effectively attained. It should be appreciated that modifications in the present invention may be made without departing from the scope of the invention as set forth in the following claims.

I claim:

1. A system for monitoring a moving web for breaks in the web, said system comprising
    A. a light source,
    B. a clock for generating a train of pulses, said clock being connected to the light source so that the clock pulses intermittently excite the light source,
    C. a light sensor responsive to the light from the light source so as to generate sense pulses in response to light from the source,
    C. a light sensor responsive to the light from the light source so as to generate sense pulses in response to light from the source,
    D. means for positioning the light source and sensor so that they are aimed at a selected point in the path of a moving web,
    E. a monitor circuit responsive to the sense pulses for generating an alarm signal, and
    F. a gate in circuit between the sensor and the monitor circuit, said gate being activated by the coincidence of clock pulses and sense pulses so that the monitor circuit generates an alarm signal depending upon the presence or absence of web at the selected point in the web path, said positioning means being arranged to mount the light source and light sensor in a position close to the web path and on opposite sides of a center line perpendicular to the web path each at an angle relative to the center line such that the system is sensitive to a slack web condition at the selected poinnt, but insensitive to a fluttering web at the selected point.

2. The system defined claim 1 wherein the positioning means is arranged to position the light source and sensor on opposite sides of the web path.

3. The system defined in claim 1 and further including an indicator responsive to the output of the monitoring circuit for indicating whether the sensor is sensing web at the selected point.

4. The system defined in claim 1
    A. wherein the positioning means is arranged to position the source and sensor on the same side of the web path, and
    B. further including
        1. means for amplifying the output pulses from the sensor, and
        2. means for applying the amplifier output to control the sensor so that the amplifier output pulses have uniform amplitude despite variations in the reflectiveness of web in the web path.

5. A system for monitoring a moving web for breaks in the web, said system comprising
    A. a light source directed on the web to be monitored,
    B. a clock connected to the light source, said clock generating a train of pulses for intermittently exciting the light source,
    C. a light sensor positioned so as to receive the reflections of the source light from the web and generate sense pulses in response thereto,
    D. a comparator circuit connected to receive the sense pulses and compare the level thereof to a predetermined level, said comparator circuit generating an output pulse each time a sense pulse exceeds said predetermined level,
    E. a monitoring circuit responsive to pulses from the comparator for generating an alarm signal in the absence of a selected number of comparator output pulses, and
    F. a gate connected between the monitoring circuit and the comparator circuit, said gate being activated by the coincidence of the clock pulses and the comparator output pulses so that the monitor circuit receives output pulses from the comparator and does not generate an alarm signal as long as web is present between the light source and the light sensor.

6. The system defined in claim 1 wherein the light source is comprised of a light-emitting diode.

7. The system defined in claim 6 wherein the light source also includes an oscillator which controls the diode and whose output is a train of pulses whose duration is short relative to the pulse period so that the diode has a small duty cycle.

8. The system defined in claim 1 wherein the light source produces light in the infrared region of the spectrum.

9. The system defined in claim 8 wherein the sensor includes an infrared filter which receives and passes the light from the source.

10. The system defined in claim 1 and further including a comparator circuit connected between the sensor and the monitor circuit, said comparator circuit comparing the level of the sense pulses to a predetermined level and generating output pulses to the monitor circuit each time a sense pulse exceeds said predetermined level.

11. The system defined in claim 10 wherein
    A. the positioning means is arranged to position the source and sensor on the same side of the web path, and
    B. the monitor circuit generates an alarm signal only in the absence of a selected number of comparator output pulses.

12. A system for monitoring a moving web for breaks in the web, said system comprising
    A. a light source,
    B. a clock for generating a train of pulses, said clock being connected to the light source so that the clock pulses intermittently excite the light source,
    C. a light sensor responsive to the light from the light source so as to generate sense pulses in response to light from the source,
    D. means for positioning the light source and sensor so that they are aimed at a selected point in the path of a moving web,
    E. a monitor circuit responsive to the sense pulses for generating an alarm signal, and
    F. a gate in circuit between the sensor and the monitor circuit, said gate being activated by the coincidence of clock pulses and sense pulses so that the monitor circuit generates an alarm signal depending upon the presence or absence of web at the selected point in the web path, said positioning means being arranged to mount the light source and light sensor in a position close to the web path and on opposite sides of a center line perpendicular to the web path each at an angle relative to the center line such that the system is sensitive to a slack web condition at the selected point, but insensitive to a fluttering web at the selected point.

13. The system defined in claim 12 wherein the angle is substantially 33°.

* * * * *